M. SCHLESSMAN.
WAGON-BRAKE.
No. 179,066. Patented June 20, 1876.
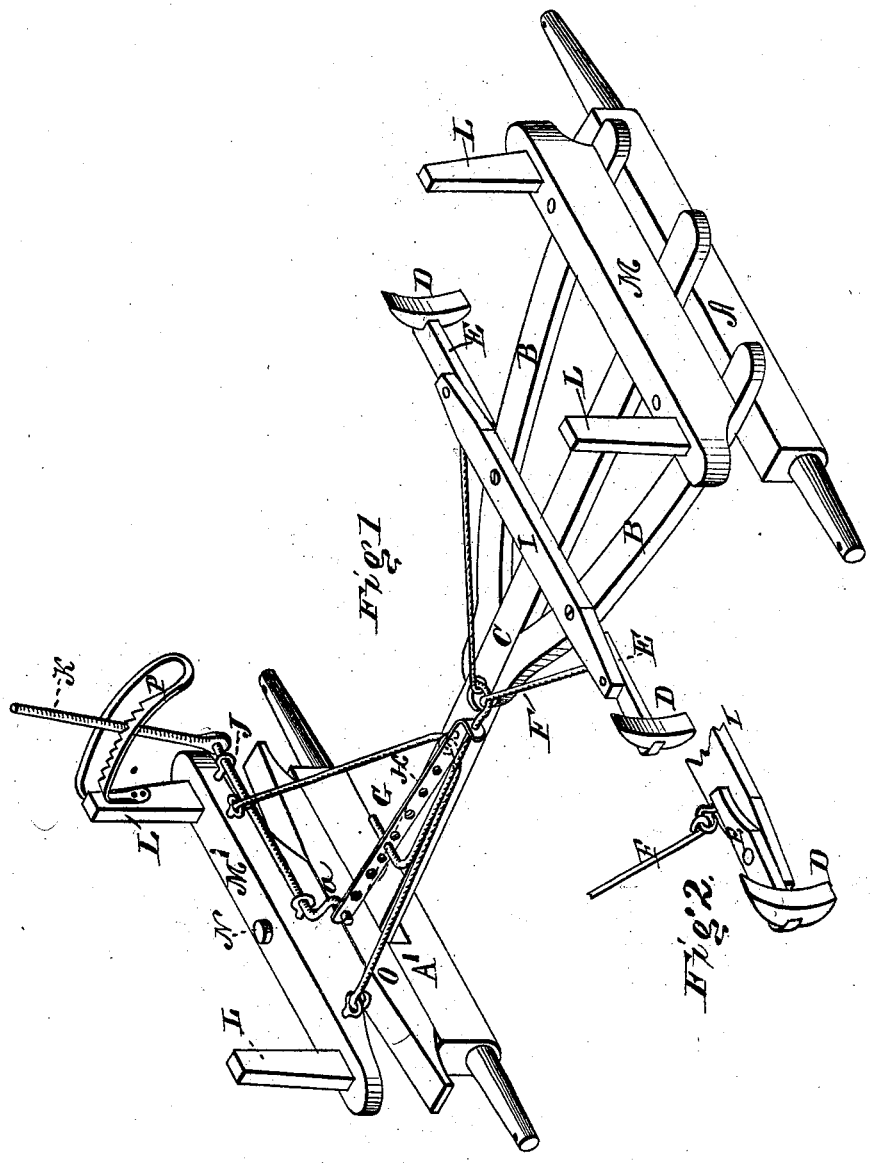
WITNESSES
F. L. Ourand
C. L. Evert
INVENTOR
M. Schlessman,
By Alexander Mason
Attorneys

UNITED STATES PATENT OFFICE.

MICHAEL SCHLESSMAN, OF COLUMBIA CITY, INDIANA.

IMPROVEMENT IN WAGON-BRAKES.

Specification forming part of Letters Patent No. 179,066, dated June 20, 1876; application filed March 30, 1876.

*To all whom it may concern:*

Be it known that I, MICHAEL SCHLESSMAN, of Columbia City, in the county of Whitley, and in the State of Indiana, have invented certain new and useful Improvements in Wagon-Brakes; and do hereby declare that the following is a full, clear, and exact description thereof, reference being had to the accompanying drawings, and to the letters of reference marked thereon, making a part of this specification.

The nature of my invention consists in the construction and arrangement of a wagon-brake, as will be hereinafter more fully set forth.

In order to enable others skilled in the art to which my invention appertains to make and use the same, I will now proceed to describe its construction and operation, referring to the annexed drawing, in which—

Figure 1 is a perspective view of the running gear of a wagon with my brake attached thereto. Fig. 2 is a detailed view of one end of the brake-bar.

A represents the hind axle with the hounds B B. C is the reach, and M the hind bolster. A' is the front axle, O the sand-board, and M' the front bolster fastened by the king-bolt N. L L are the standards at the ends of the bolsters M M'. These parts are all constructed in any of the known and usual ways. I represents the brake-bar which is laid across the reach and rear hounds a suitable distance in front of the hind wheels. This brake-bar is secured firmly to the hounds B B, so that it cannot move. At each end of this brake-bar is pivoted a lever, E, to the outer end of which is secured the ordinary brake-block or shoe D, and the inner end of said lever is, by a rod, F, connected to one end of a coupling-hook, G, both the rods F F being connected to the same hook. The straight part of the coupling-hook G passes through the bent rear end of a perforated metal strap, H, the front end of which is placed upon a crank, a, formed at the inner end of a shaft, J, placed in bearings on the rear side of the front bolster M'. The hook end of the coupling G is inserted in either one of the perforations of the strap H, according to the length of the wagon. On the outer end of the shaft J is a lever, K, to be held in a ratchet-bar, P, secured to one of the standards L. By operating the lever K the crank a, by means of the intermediate parts H G and F F, turns the levers E E on their pivots so as to apply the brake-blocks D D to the wheels, or remove them from the same according to the direction in which the lever K is turned. As the wagon is lengthened and shortened in the usual manner, the coupling-hook G is removed from one hole in the strap H and inserted in another, so as to adjust the brake to the length of the wagon.

It will be noticed that every part of the brake mechanism, including the ratchet-bar P, is attached to the running-gear, so that there will be nothing whatever thereof on the wagon-box.

Having thus fully described my invention, what I claim as new, and desire to secure by Letters Patent, is—

The combination, with the pivoted levers E E carrying the brake-blocks D D, of the rods F F, coupling-hook G, perforated metal strap H, crank-shaft J with lever K, and ratchet-bar P, all constructed substantially as and for the purposes herein set forth.

In testimony that I claim the foregoing I have hereunto set my hand this 24th day of February, 1876.

MICHAEL SCHLESSMAN.

Witnesses:
 JACOB R. BITTENGER,
 G. L. BITTINGER.